H. A. DOERNER.
RECOVERY OF MOLYBDENUM FROM ITS ORES.
APPLICATION FILED APR. 14, 1919.
1,329,380.
Patented Feb. 3, 1920.
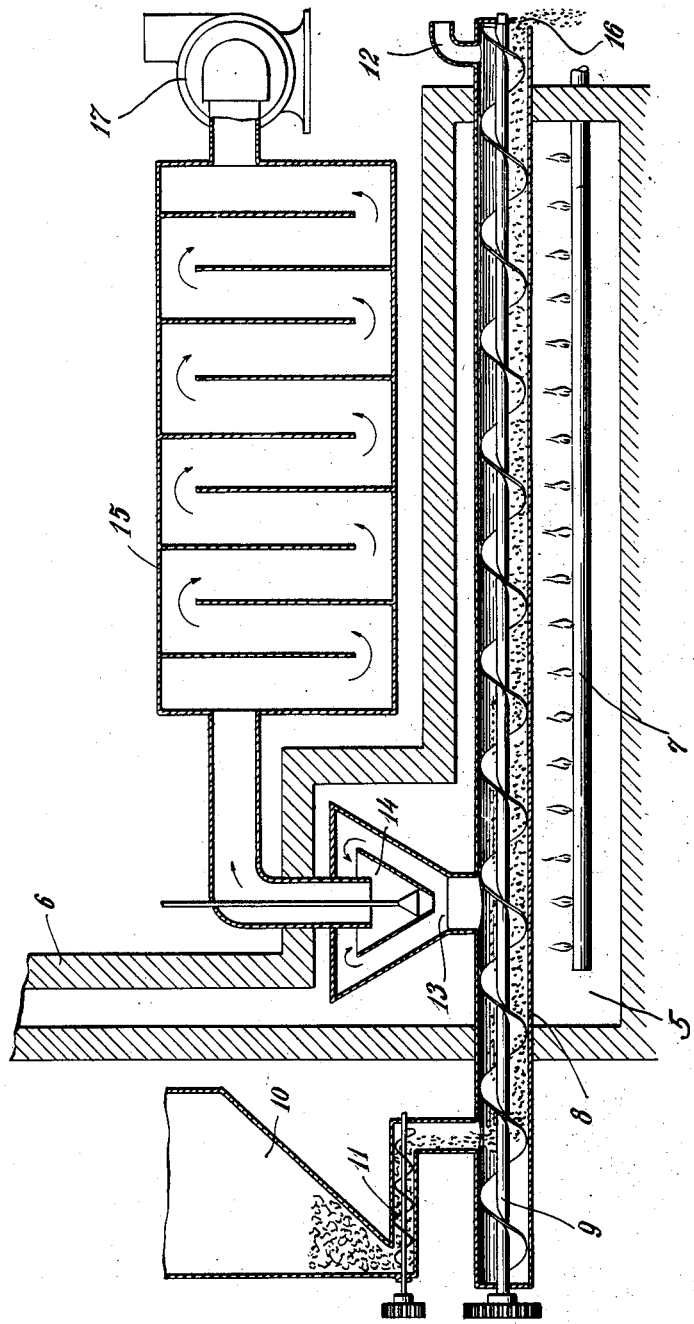

UNITED STATES PATENT OFFICE.

HENRY ALFRED DOERNER, OF MERIDEN, CONNECTICUT.

RECOVERY OF MOLYBDENUM FROM ITS ORES.

1,329,380.  Specification of Letters Patent.  Patented Feb. 3, 1920.

Application filed April 14, 1919. Serial No. 289,834.

*To all whom it may concern:*

Be it known that I, HENRY ALFRED DOERNER, residing at Meriden, in the county of New Haven, State of Connecticut, have invented certain new and useful Improvements in the Recovery of Molybdenum from its Ores; and I do hereby declare the following to be a full, clear, and exact description of the invention, such as will enable others skilled in the art to which it appertains to make and use the same.

This invention relates to the extraction and recovery of molybdenum from ores, concentrates and other molybdenum containing materials, and has for its object the provision of an improved method of treating molybdenum-containing materials for the recovery of their molybdenum content.

It has heretofore been proposed to recover molybdenum from its ores by heating a mixture of the ore with a suitable chlorid and distilling off the molybdenum in the form of volatile chlorids. In such processes, the chlorid is decomposed and the chlorin component thereof chemically unites with the molybdenum contained in the material undergoing treatment. In my United States Patents Nos. 1,299,559 and 1,299,560, patented April 8, 1919, I have described how the liberation of chlorin from a chlorid mixed with the molybdenum-containing material can be facilitated, and have also described how ores of molybdenum containing sulfur may be successfully subjected to the chlorid treatment. In all of these prior processes of treating molybdenum-containing materials, volatile chlorids or oxychlorids of molybdenum are formed, either as a result of the action upon the molybdenum content of the material of nascent chlorin, liberated from a chlorid admixed with the material undergoing treatment, or as the result of a chemical reaction between a chlorid and a molybdenum compound.

The present invention involves the treatment of the molybdenum-containing material with chlorin gas at a sufficiently high temperature to produce volatile chlorids or oxychlorids of molybdenum. I have found a temperature of about 500° C. to be sufficiently high for this purpose. The resulting gaseous product containing the volatile chlorids or oxychlorids of molybdenum are drawn off and subjected to any appropriate subsequent treatment for the recovery of the molybdenum compounds. Thus, the volatile products of the reaction, containing the molybdenum as chlorids or oxychlorids, may be passed through a condenser where the molybdenum chlorids are condensed as such, or are decomposed by the action of steam or water into oxids of molybdenum and hydrochloric acid. The oxids of molybdenum may be separated from the hydrochloric acid by maintaining the condenser at a temperature, say about 200° C., such that the hydrochloric acid will pass through the condenser as a gas and leave the molybdenum oxids deposited in the condenser. In this case it is desirable to provide another condenser to recover the hydrochloric acid.

In practising the invention, I prefer to carry out the process in a continuous manner, and on the counter-current principle. The molybdenum-containing material is, accordingly, fed through a suitable reaction chamber in any convenient manner. Chlorin gas is passed through the reaction chamber in the opposite direction to the travel of the ore. The gaseous products of the reaction are preferably first passed through a dust collector and are then subjected to such further treatment as is desired for the recovery therefrom of the molybdenum compounds. Any suitable means may be provided for maintaining the material at the reaction temperature.

In the accompanying drawings, I have diagrammatically indicated a form of apparatus in which the method of the invention may be practised.

The drawings diagrammatically represent a furnace housing or combustion chamber 5 having a stack 6 for the exhaust of the products of combustion. A gaseous or liquid fuel burner 7 is arranged within the furnace housing 5 in such a position that the flame therefrom is directed toward a reaction chamber 8. The reaction chamber may be a cast iron pipe and extends through the furnace housing 5. A screw or agitating conveyer 9 is operatively mounted within the reaction chamber 8, and operates to feed the molybdenum-containing material through this chamber. The raw material to be treated is delivered to a hopper 10, from the discharge end of which it is fed into the reaction chamber 8 by means of a screw conveyer 11.

Chlorin gas is introduced into the reaction chamber 8 through a gas inlet 12. The gaseous products, resulting from the action of the chlorin gas on the molybdenum-containing material, are withdrawn from the reaction chamber through a gas outlet 13. These gaseous products pass through a dust collector 14, arranged within the furnace housing 5, and then pass to a suitable condenser 15. The reaction chamber 8 has a discharge opening 16 for the withdrawal of the non-voltaile material. It will be observed that the molybdenum-containing material passes through the reaction chamber in a continuous manner, and during its passage therethrough is subjected to the action of a current of chlorin gas. The reaction chamber is, in effect, sealed at both ends, so that the current of chlorin gas introduced through the gas inlet 12 must pass through the reaction chamber in a direction opposite to the travel of the molybdenum-containing material, and the gaseous products resulting from the reaction are all withdrawn through the gas outlet 13. It is good practice to place an evacuating fan or blower 17 at the end of the condensing system in order to facilitate the passage of the gases through the system and, by reduction of pressure, to prevent leaks.

The molybdenum ore, such, for example, as molybdenite, reduced to a suitable physical condition, is maintained at a temperature of about 500° C. during its passage through the reaction chamber 8. When brought into contact with chlorin gas, at this temperature, I have found that the chlorin gas reacts upon the molybdenum content of the ore, or the like, with the production of volatile chlorids or oxychlorids of molybdenum. These volatile chlorid compounds of molybdenum may be directly condensed as such, or they may be decomposed by the action of steam or water into oxids of molybdenum and hydrochlorid acid. The hydrochlorid acid can be separated by evaporation or distillation and recovered, leaving behind the molybdenum oxid. Inasmuch as molybdenum forms a number of oxids, as well as a number of volatile chlorids, the final product will vary according to the variations in the chlorid distillate.

While I have herein described a type of furnace adapted for the practice of the present invention, I do not desire to limit myself to the use of any particular type of furnace, since it will be evident that the method of the invention may be carried out in other forms of apparatus.

I claim:

1. The method of treating molybdenum ores, concentrates, and other molybdenum-containing materials which comprises passing a current of chlorin gas through the material while maintaining the material at a temperature of about 500° C., and treating the resulting gaseous product for the recovery therefrom of compounds of molybdenum; substantially as described.

2. The method of treating molybdenum ores, concentrates, and other molybdenum-containing materials which comprises passing a current of chlorin gas through the material while maintaining the material at a sufficiently high temperature to effect the formation of volatile chlorids or oxychlorids of molybdenum, and separating the compounds of molybdenum contained in the gaseous product resulting from the action of said current of chlorin gas on the molybdenum containing material; substantially as described.

3. The method of treating molybdenum ores, concentrates, and other molydenum-containing materials, which comprises subjecting the material to the action of chlorin gas at a sufficiently high temperature to produce volatile chlorids or oxychlorids of molybdenum, and treating the resulting gaseous product for the recovery therefrom of compounds of molybdenum; substantially as described.

4. The method of treating molybdenum ores, concentrates, and other molybdenum-containing materials which comprises feeding the material through a reaction chamber, subjecting the material in said chamber to the action of a current of chlorin gas passed through the chamber in a direction opposite to the travel of the ore, maintaining the material at a sufficiently high temperature to effect the formation of volatile chlorids or oxychlorids of molybdenum, and treating the resulting gaseous product for the recovery therefrom of compounds of molybdenum; substantially as described.

5. The method of treating molybdenum ores, concentrates, and other molybdenum-containing materials which comprises subjecting the material to the action of chlorin gas at a sufficiently high temperature to produce volatile chlorids or oxychlorids of molybdenum, withdrawing the resulting gaseous product, and condensing the compounds of molybdenum contained in said product; substantially as described.

6. The method of treating molybdenum ores, concentrates, and other molybdenum-containing materials which comprises subjecting the material to the action of chlorin gas at a sufficiently high temperature to produce volatile chlorids or oxychlorids of molybednum, withdrawing the resulting gaseous product, subjecting the gaseous product to a dust-removing treatment, and recovering the compounds of molybdenum from said products; substantially as described.

In testimony whereof I affix my signature.

HENRY ALFRED DOERNER.